(12) United States Patent
Nishiyama

(10) Patent No.: US 6,749,327 B2
(45) Date of Patent: Jun. 15, 2004

(54) VEHICLE HEADLAMP

(75) Inventor: Masaru Nishiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/374,536

(22) Filed: Feb. 26, 2003

(65) Prior Publication Data

US 2003/0179587 A1 Sep. 25, 2003

(30) Foreign Application Priority Data

Mar. 22, 2002 (JP) ................................. P. 2002-080428

(51) Int. Cl.[7] ................................................. B60Q 1/00
(52) U.S. Cl. ..................... 362/548; 362/546; 362/265
(58) Field of Search ........................... 362/263, 265, 362/538, 539, 546, 548, 549

(56) References Cited

U.S. PATENT DOCUMENTS 6,161,951 A     12/2000  Yoneyama et al. ......... 362/516
6,382,823 B1    5/2002   Kibayashi ................... 362/548
6,536,920 B2 *  3/2003   Imachi et al. ............... 362/265
6,550,951 B2 *  4/2003   Tanaka et al. .............. 362/546

* cited by examiner

Primary Examiner—Stephen F. Husar
(74) Attorney, Agent, or Firm—Fish & Richardson P.C.

(57) ABSTRACT

A discharge bulb and a discharge bulb-lighting device are connected together by a power supply cord via an opening. A waterproof wall of a cylindrical shape is formed on and projects from a portion of the body disposed near a peripheral edge of the opening. Positioning ribs are formed on and project from a portion of the body disposed with surrounding an outer surface of the waterproof wall. A waterproof rib of a cylindrical shape, which is smaller in diameter than the waterproof wall, is formed on the discharge bulb-lighting device. Restraint portions for contacting with inner surfaces of the positioning ribs are formed on the discharge bulb-lighting device. The discharge bulb-lighting device is fastened by screws to the body, with an O-ring held between the waterproof rib and the waterproof wall and also with the restraint portions held in contact respectively with the inner surfaces of the positioning ribs.

2 Claims, 5 Drawing Sheets

VEHICLE HEADLAMP

BACKGROUND OF THE INVENTION

1. Field of the Invention

This invention relates to a novel vehicle headlamp. More specifically, the invention relates to a vehicle headlamp having a discharge bulb-lighting device mounted on an outer surface of a body, and more particularly to the art of positively waterproofing that portion of the body on which the discharge bulb-lighting device is mounted.

2. Description of the Related Art

In a vehicle headlamp in which a discharge bulb-lighting device for lighting a discharge bulb within a body is mounted on an outer surface of the body, an opening for the passage of power supply cords (for connection between the discharge bulb and the discharge bulb-lighting device) therethrough need to be formed in the body. Therefore, it is necessary to waterproof the region between the opening and the discharge bulb-lighting device.

There has been proposed a vehicle headlamp in which the waterproof effect is achieved with a structure shown in FIG. 8.

More specifically, an opening b is formed through a bottom wall of a body a within which a discharge bulb (not shown) is provided. A downwardly-open fitting groove c is formed on a lower surface of the body a at a peripheral edge portion of the opening b over an entire periphery thereof. A packing d is fitted in the fitting groove c. A plurality of screw-fixing bosses e are formed around the fitting groove c.

A plurality of screw-fixing piece portions g are formed on and project from a peripheral surface of a discharge bulb-lighting device f. A fitting rib h is formed on that side (face) of this discharge bulb-lighting device, facing the bottom surface of the body a, in opposed relation to the fitting groove c.

The discharge bulb-lighting device f is located so that a distal end of the fitting rib h is abutted against the packing d provided in the fitting groove c of the body a. In this condition, tapping screws i, passing respectively through the screw-fixing piece portions g from the lower side; are threaded respectively into bottom holes (not shown) formed respectively in the screw-fixing bosses e, thereby fixedly mounting the discharge bulb-lighting device on the body a.

Then, power supply cords j are connected to a discharge bulb (not shown).

In the above vehicle headlamp, the fitting rib h, formed on the discharge bulb-lighting device f, is abutted against the packing d fitted in the fitting groove c, thereby forming a waterproof seal at the area of contact between the packing d and the fitting rib h.

Therefore, that portion of the packing d, against which the fitting rib h is abutted, is much more deformed than the other portion thereof. Therefore, the packing d is subjected to permanent deformation to degrade the waterproofing performance.

The discharge bulb-lighting device f is secured to the body a by threading the tapping screws i respectively into the bottom holes formed respectively in the screw-fixing bosses e. If the direction of application of a threading torque to the tapping screw i deviates perpendicularly from the proper threading direction, the direction of treading of the tapping screw i is deflected. This causes the position of mounting of the discharge bulb-lighting device f to deviate from its proper mounting position. When such a deviation occurs, the distal end of the fitting rib h, while squeezing the packing d, deviates in the direction of the width of the fitting groove c, so that the deformation of the packing d becomes more remarkable and uneven. This adversely affects the waterproof performance.

Under the above circumstances, in the vehicle headlamp shown in FIG. 8, the portion of the body a where the discharge bulb-lighting device f is mounted may not be waterproofed reliably.

SUMMARY OF THE INVENTION

An object of this invention is to provide a vehicle headlamp, having a discharge bulb-lighting device that is waterproof.

A vehicle headlamp of the present invention has an opening formed in a body within which a discharge bulb is provided. A discharge bulb-lighting device is mounted on the body to cover the opening. The discharge bulb and the discharge bulb-lighting device are connected together by a power supply cord via the opening. The waterproof wall of a cylindrical shape is formed on and projects from that portion of the body disposed near a peripheral edge of the opening. A positioning rib is formed on and projects from that portion of the body disposed in surrounding relation to an outer surface of the waterproof wall. A waterproof rib of a cylindrical shape, which is smaller in diameter than the waterproof wall, is formed on the discharge bulb-lighting device. A restraint portion for contacting with an inner surface of the positioning rib is formed on the discharge bulb-lighting device. The discharge bulb-lighting device is fastened by screws to the body, with an O-ring held between the waterproof rib and the waterproof wall and also with the restraint portion held in contact with the inner surface of the positioning rib.

Therefore, in the vehicle headlamp of the present invention, that portion of the body, on which the discharge bulb-lighting device is mounted, is positively waterproofed. Namely, the O-ring is uniformly compressed between the waterproof wall of the body and the waterproof rib of the discharge bulb-lighting device and, therefore, is deformed uniformly over an entire periphery thereof. Its elastic fatigue is smaller than where the O-ring undergoes a large deformation at a localized portion thereof. Therefore, the O-ring can maintain the waterproofing function for a long period of time.

Furthermore, at the time of fastening the discharge bulb-lighting device to the body by the screws, even if a rotating torque is applied to each screw so that a moment, acting in other direction than the threading direction, is added to cause the discharge bulb-lighting device to have a tendency to deviate in a direction perpendicular to the threading direction, the discharge bulb-lighting device is accurately mounted in the intended mounting position. This is because the restraint portion of the discharge bulb-lighting device is restrained from being displaced by the positioning rib of the body. Therefore, the O-ring will not be unevenly deformed and can maintain the waterproofing function for a long period of time.

DETAILED DESCRIPTION OF THE PREFERRED EMBODIMENTS

Figure 1:
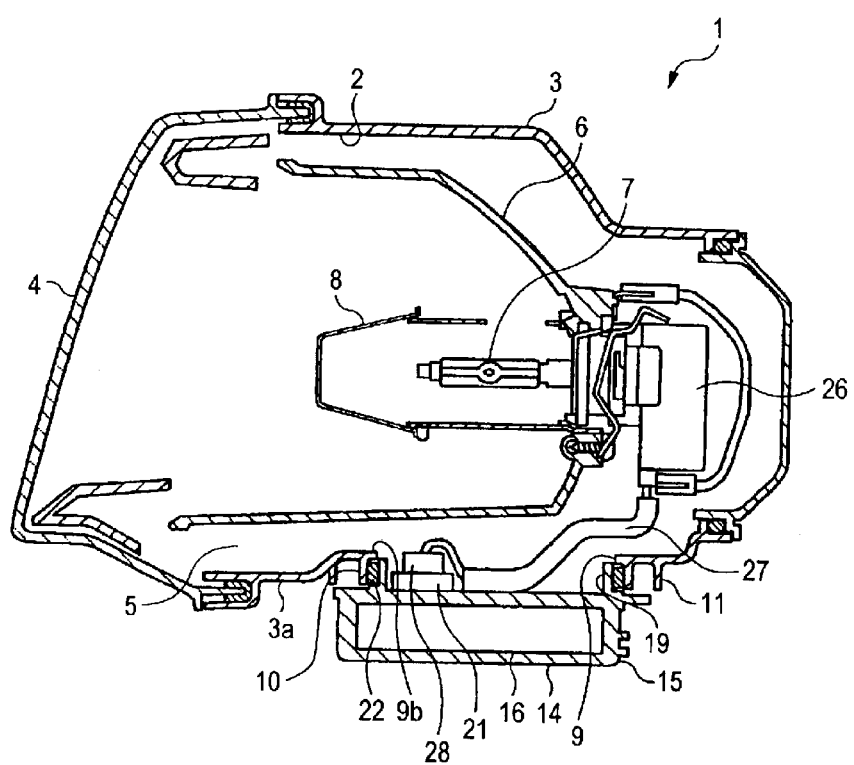
FIG. 1, together with FIGS. 2 to 7, shows a vertical cross-sectional view of an embodiment of a vehicle headlamp of the present invention.
Figure 2:
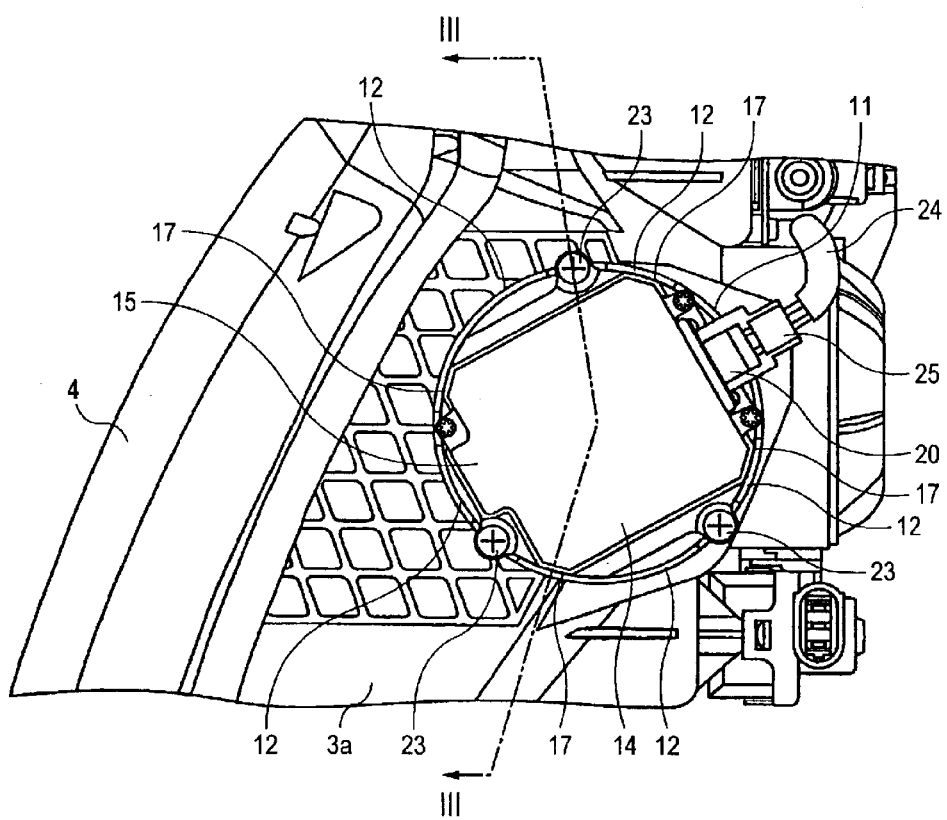
FIG. 2 is a bottom view showing a portion.
Figure 3:
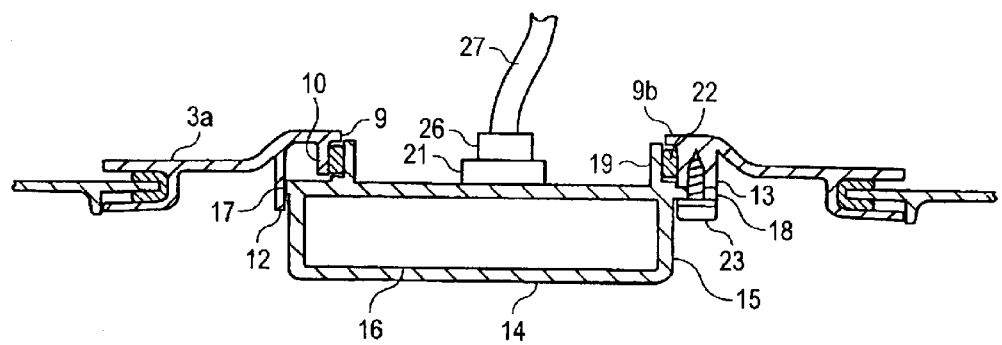
FIG. 3 is a cross-sectional view taken along the line III—III of FIG. 2.
Figure 4:
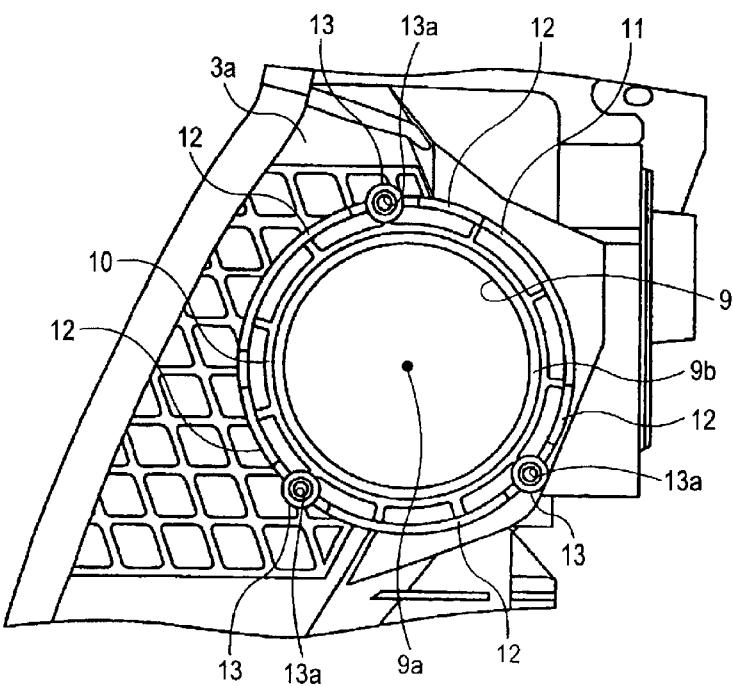
FIG. 4 is a bottom view of a body.
Figure 5:
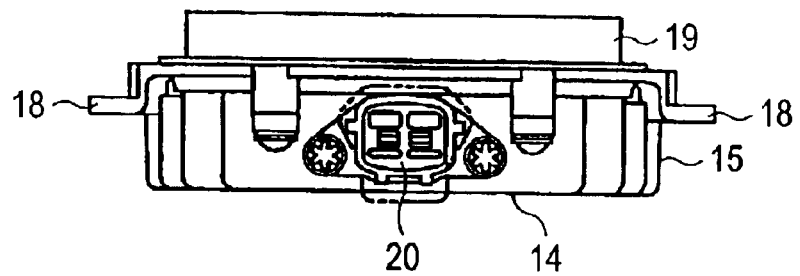
FIG. 5, together with FIGS. 6 and 7, shows an elevated view of a discharge bulb-lighting device.
Figure 6:
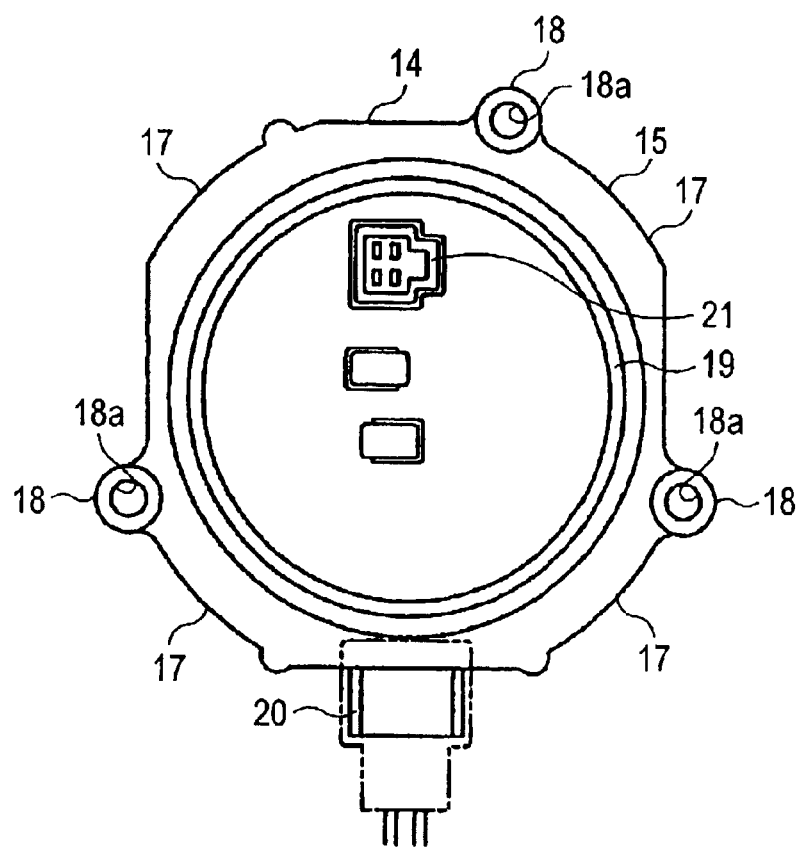
FIG. 6 is a top plan view.
Figure 7:
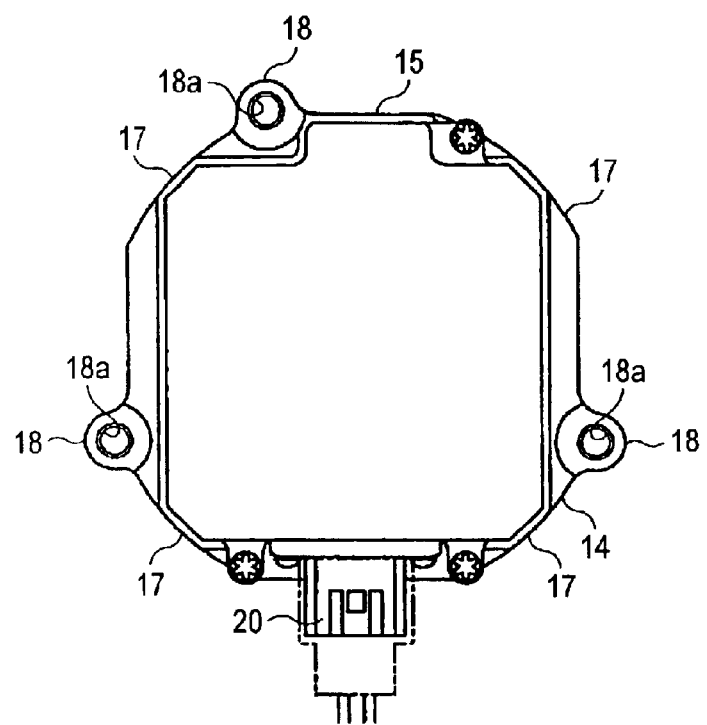
FIG. 7 is a bottom view.
Figure 8:
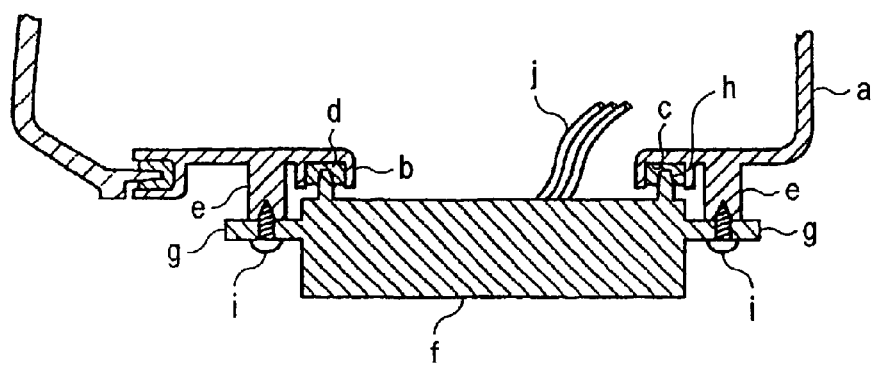
FIG. 8 is a cross-sectional view of a conventional vehicle headlamp.

An embodiment of a vehicle headlamp of the present invention will now be described with reference to the drawings.

The vehicle headlamp 1 includes a lamp body 3 having a recess 2 open to a front side thereof and a front cover (lens) 4 that is mounted on the lamp body 3 to cover the front side of the recess 2, so that a lamp space 5 is formed in the lamp body. A reflector 6 is tiltably provided within the lamp space 5. A discharge bulb 7 is removably attached to a generally central portion of a rear portion of the reflector 6. A light-blocking member 8 is provided to cover the front side of the discharge bulb 7 so that direct light from the discharge bulb 7 will not radiate forward through the front cover 4.

An opening 9 of a circular shape is formed through a bottom wall 3a of the lamp body 3. A waterproof wall 10 is formed on and projects downwardly from a lower surface of the bottom wall 3a of the lamp body 3 and is slightly spaced from a peripheral edge of the opening 9. The waterproof wall 10 is formed into a cylindrical shape and has its center or axis disposed at the center 9a of the opening 9. Therefore, a flange portion 9b is formed between an upper end of the waterproof wall 10 and the peripheral edge of the opening 9.

An outer wall 11 is formed on the lower surface of the bottom wall 3a of the lamp body 3 in surrounding relation to the waterproof wall 10. A height (that is, the amount of projecting from the bottom wall 3a) of this outer wall 11 is generally equal to that of the waterproof wall 10. This outer wall 11 is also formed into a cylindrical shape and has its center or axis disposed at the center 9a of the opening 9. Therefore, the waterproof wall 10 and the outer wall 11 are concentric with each other. Positioning ribs 12 are formed on and project downwardly respectively from suitable portions of a lower end of the outer wall 11. Therefore, these positioning ribs 12 are disposed on a circle concentric with the waterproof wall 10. Screw-fixing bosses 13 are formed on and project downwardly from the lower surface of the bottom wall 3a of the lamp body 3 in integrally-connected relation to the outer wall 11 and are disposed respectively at those regions where the positioning ribs 12 are not provided. The height of projection of each of these screw-fixing bosses 13 from the bottom wall 3a is generally equal to the height of projection of the outer wall 11 from the bottom wall 3a. Each of the screw-fixing bosses 13 has a bottom hole 13a open to its lower end.

A discharge bulb-lighting device 14 includes a casing body 15. A lighting circuit 16 is contained in this casing body. An outer peripheral surface of the casing body 15 has a shape generally resembling a square shape, having four chamfered corners, when viewed from the top or the bottom thereof. Those portions 17 of the outer peripheral surface of the casing body 15, corresponding respectively to the chamfered portions, serve respectively as restraint portions and are formed respectively into arcuate surfaces which are disposed on a common circle. The common circle is of such a size that the restraint portions 17 are held in contact with the inner surfaces of the corresponding positioning ribs 12, respectively. Screw-fixing piece portions 18 are formed on and project outwardly from the outer peripheral surface of the casing body 15 and are circumferentially spaced from one another. Those portions 18 are disposed adjacent to an upper edge of the outer peripheral surface of the casing body 15. A screw passage hole 18a is formed through each of the screw-fixing piece portions 18.

A waterproof rib 19 of a cylindrical shape is formed on and projects upwardly from the upper surface of the casing body 15. A circle, defined by the waterproof rib 19, is concentric with the circle on which the restraint portions 17 are disposed. The circle, defined by the waterproof rib 19, is slightly smaller than a circle defined by the waterproof wall 10 on the lamp body 3.

An input connector 20 is formed on and projects from the outer peripheral surface of the casing body 1. An output connector 21 is formed on that portion of the upper surface of the casing body 15 encircled by the waterproof rib 19.

The discharge bulb-lighting device 14 is mounted on the lamp body 3 in the following manner.

First, an O-ring 22 is fitted on the waterproof rib 19 of the discharge bulb-lighting device 14. In this condition, the waterproof rib 19 is fitted into the waterproof wall 10 of the lamp body 3. During this operation, the restraint portions 17 of the discharge bulb-lighting device 14 are contacted respectively to the inner surfaces of the positioning ribs 12 of the lamp body 3 and, therefore, are positioned by these positioning ribs, respectively. Therefore, the waterproof rib 19 and the waterproof wall 10 are disposed in concentric relation to each other. The O-ring 22 is uniformly compressed between the waterproof rib 19 and the waterproof wall 10 and, therefore, is elastically deformed uniformly over the entire periphery thereof. This configuration maintains a watertight seal between the waterproof rib 19 and the waterproof wall 10.

Then, the screw passage holes 18a of the screw-fixing piece portions 18 formed on the discharge bulb-lighting device 14, are aligned respectively with the bottom holes 13a of the screw-fixing bosses 13 formed on the lamp body 3. In this condition, tapping screws 23 are passed respectively through the screw passage hole 18a from the lower side and are threaded respectively into the bottom holes 13a. As a result, the discharge bulb-lighting device 14 is mounted on the bottom surface of the lamp body 3. The opening 9 in the lamp body 3 is waterproofed by the O-ring 22 held between the waterproof wall 10 of the lamp body 3 and the waterproof rib 19 of the discharge bulb-lighting device 14.

Then, a power source-side connector 25, provided at a distal end of a power cord 24 connected to a power source (battery) (not shown) mounted on a vehicle, is connected to the input connector 20 provided on the discharge bulb-lighting device 14. A bulb-side connector 28, provided at a distal end of a power supply cord 27 extending from a power supply socket 26, is connected to the output connector 21 provided on the discharge bulb-lighting device 14. Then, the power supply socket 26 is attached to a base portion (not shown) of the discharge bulb 7, so that the lighting circuit 16 of the discharge bulb-lighting device 14 and the discharge bulb 7 are connected together by the power supply cord 27 extending via the opening 9 in the lamp body 3. For lighting the discharge bulb 7, a source voltage of the battery is increased by the lighting circuit 16 and also is converted into a lighting voltage (which is a high AC voltage) by this lighting circuit 16 through DC-to-AC conversion. This lighting voltage is applied to the discharge bulb 7 to light the same. There is provided a starting circuit which applies a starting voltage to the discharge bulb 7 in superimposed relation to the lighting voltage at the time of activating the discharge bulb 7 (that is, starting the lighting of the discharge bulb). The starting circuit can be provided within the power supply socket 26. The starting circuit, together with the lighting circuit 16, can also be provided within the casing body 15 of the discharge bulb-lighting device 14. Where the starting circuit is provided within the casing body 15, the term "lighting circuit," used in the specification of the present application, is interpreted in a broad sense as containing the starting circuit.

In the above vehicle headlamp 1, the O-ring 22 is compressed uniformly between the waterproof wall 10 of the lamp body 3 and the waterproof rib 19 of the discharge bulb-lighting device 14 and, therefore, is deformed uniformly over the entire periphery thereof. Its elastic fatigue is smaller than where the O-ring undergoes a large deformation at a localized portion thereof. Therefore, the O-ring can maintain the waterproofing function for a long period of time.

At the time of fastening the discharge bulb-lighting device 14 to the lamp body 3 by the tapping screws 23, even if a rotating torque is applied to the tapping screw 23 so that a moment, acting in other direction than the threading direction, is added to cause the discharge bulb-lighting device 14 to have a tendency to deviate in a direction perpendicular to the threading direction, the discharge bulb-lighting device 14 is accurately mounted in the intended mounting position. This is because the restraint portions 17 of the discharge bulb-lighting device 14 are restrained from being displaced by the positioning ribs 12 of the lamp body 3, respectively. Therefore, the O-ring 22 will not be unevenly deformed and can maintain the waterproofing function for a long period of time.

In the above embodiment, although the positioning ribs, as well as the restraint portions for respectively contacting the inner surfaces of these positioning ribs, are provided in a discrete or interrupted manner in concentric relation to the waterproof wall, one or both of the positioning ribs and the restraint portions may be formed continuously over the entire circumference.

The shapes and structures of the various portions of the above embodiment are examples for performing the present invention. The scope of the present invention should not be construed to be limited by these examples.

As is clear from the foregoing description, in the vehicle headlamp of the present invention, the opening is formed in the body within which the discharge bulb is provided. The discharge bulb-lighting device is mounted on the body to cover the opening. The discharge bulb and the discharge bulb-lighting device are connected together by the power supply cord via the opening. The waterproof wall of a cylindrical shape is formed on and projects from that portion of the body disposed near a peripheral edge of the opening. A positioning rib is formed on and projects from that portion of the body disposed in surrounding relation to an outer surface of the waterproof wall. A waterproof rib of a cylindrical shape, which is smaller in diameter than the waterproof wall, is formed on the discharge bulb-lighting device. A restraint portion for contacting with an inner surface of the positioning rib is formed on the discharge bulb-lighting device. The discharge bulb-lighting device is fastened by screws to the body, with an O-ring held between the waterproof rib and the waterproof wall and also with the restraint portion held in contact with the inner surface of the positioning rib.

Therefore, in the vehicle headlamp of the present invention, that portion of the body, on which the discharge bulb-lighting device is mounted, is positively waterproofed. Namely, the O-ring is uniformly compressed between the waterproof wall of the body and the waterproof rib of the discharge bulb-lighting device and, therefore, is deformed uniformly over the entire periphery thereof. Its elastic fatigue is smaller than where the O-ring undergoes a large deformation at a localized portion thereof. Therefore, the O-ring can maintain the waterproofing function for a long period of time.

Furthermore, at the time of fastening the discharge bulb-lighting device to the body by the screws, even if a rotating torque is applied to each screw so that a moment, acting in other direction than the threading direction, is added to cause the discharge bulb-lighting device to have a tendency to deviate in a direction perpendicular to the threading direction, the discharge bulb-lighting device is accurately mounted in the intended mounting position. This is because the restraint portion of the discharge bulb-lighting device is restrained from being displaced by the positioning rib of the body. Therefore, the O-ring will not be unevenly deformed and can maintain the waterproofing function for a long period of time.

In another embodiment, the positioning rib is disposed in concentric relation to the waterproof wall. Therefore, the waterproof wall of the body is disposed in concentric relation to the waterproof rib of the discharge bulb-lighting device, so that the position of the O-ring is stabilized, thereby positively achieving the waterproofing effect.

The present invention claims priority from Japanese patent application serial no. 2002-080428 filed on Mar. 22, 2002, which is incorporated by reference herein in its entirety.

Several embodiments of the invention have been described herein, but it should be understood that various additions and modifications could be made which fall within the scope of the following claims.

What is claimed is:

1. A vehicle headlamp comprising:

a body within which a discharge bulb is provided and having an opening;

a discharge bulb-lighting device mounted on said body to cover said opening, and said discharge bulb and said discharge bulb-lighting device connected together by a power supply cord via said opening, said discharge bulb-lighting device being fastened by screws to said body;

a waterproof wall of a cylindrical shape formed on and projecting from a portion of said body disposed near a peripheral edge of said opening;

a positioning rib formed on and projecting from a portion of said body disposed in surrounding relation to an outer surface of said waterproof wall;

a waterproof rib of a cylindrical shape, which is smaller in diameter than said waterproof wall and formed on said discharge bulb-lighting device;

a restraint portion formed on said discharge bulb-lighting device and being held in contact with an inner surface of said positioning rib; and an O-ring being held between said waterproof rib and said waterproof wall.

2. The vehicle headlamp according to claim 1, wherein said positioning rib is disposed in concentric relation to said waterproof wall.

* * * * *